(12) United States Patent
Boonpakom et al.

(10) Patent No.: US 8,944,261 B1
(45) Date of Patent: Feb. 3, 2015

(54) DRYING RACK FOR MEAT

(76) Inventors: Ken Boonpakom, Pinellas Park, FL (US); Pam Boonpakom, Pinellas Park, FL (US)

(*) Notice: Subject to any disclaimer, the term of this patent is extended or adjusted under 35 U.S.C. 154(b) by 192 days.

(21) Appl. No.: 13/489,939

(22) Filed: Jun. 6, 2012

(51) Int. Cl.
*A47F 7/00* (2006.01)

(52) U.S. Cl.
USPC .............. 211/85.4; 211/126.15; 211/189

(58) Field of Classification Search
CPC ........... F26B 9/00; F26B 9/003; F26B 9/006; F26B 9/066; A01F 25/12; A23B 4/03; A23B 4/031; A23B 4/044; A23B 7/02; A23B 7/0205; A23B 7/022; A23B 5/02; A23B 5/022; A23B 9/08
USPC .......... 211/13.1, 85.4, 126.15, 186, 189, 182; 99/483; 34/192, 195, 196, 197; 24/303
See application file for complete search history.

(56) References Cited

U.S. PATENT DOCUMENTS

| | | | | |
|---|---|---|---|---|
| 92,113 | A * | 6/1869 | Smith | |
| 281,057 | A * | 7/1883 | Hale | 312/247 |
| 323,425 | A * | 8/1885 | Johnson | 34/444 |
| 414,458 | A * | 11/1889 | Strickler et al. | 312/213 |
| 471,697 | A * | 3/1892 | Mosbacher | 108/188 |
| 641,955 | A * | 1/1900 | Hampton | 34/192 |
| 968,352 | A * | 8/1910 | Hermann | 312/3 |
| 1,266,915 | A * | 5/1918 | Brooks | 34/197 |
| 1,346,781 | A * | 7/1920 | Chavannes | 34/197 |
| 1,474,687 | A * | 11/1923 | Raby, Jr. | 108/102 |
| 1,552,210 | A * | 9/1925 | Bussler | 34/197 |
| 2,166,467 | A * | 7/1939 | Goodhue | 34/193 |
| 2,585,360 | A * | 2/1952 | Williams | 62/237 |
| 2,975,529 | A * | 3/1961 | Weber | 34/622 |
| 3,749,301 | A * | 7/1973 | Peckar | 229/125.37 |
| 3,827,019 | A * | 7/1974 | Serbu | 335/285 |
| 3,831,336 | A * | 8/1974 | Diemer | 52/653.2 |
| 4,029,004 | A | 6/1977 | Isenberg | |
| 4,065,857 | A * | 1/1978 | Nelson et al. | 34/493 |
| 4,167,901 | A | 9/1979 | Wright | |
| 4,178,844 | A * | 12/1979 | Ward et al. | 99/449 |
| 4,224,743 | A * | 9/1980 | Erickson et al. | 34/219 |
| 4,329,789 | A * | 5/1982 | Erickson | 34/195 |
| 4,376,558 | A * | 3/1983 | Bandar | 312/259 |
| 4,502,741 | A * | 3/1985 | DeVries et al. | 312/108 |
| 4,578,814 | A * | 3/1986 | Skamser | 383/99 |
| 4,719,116 | A * | 1/1988 | Crevasse | 426/315 |
| 4,816,646 | A * | 3/1989 | Solomon et al. | 219/387 |
| 4,836,393 | A * | 6/1989 | Maye | 211/188 |
| 4,862,602 | A * | 9/1989 | Krill | 34/239 |
| 4,940,149 | A * | 7/1990 | Vineis | 211/186 |
| 5,016,765 | A * | 5/1991 | Leonardo | 211/189 |
| 5,025,572 | A * | 6/1991 | Cordier | 34/202 |
| 5,158,187 | A * | 10/1992 | Taub | 211/186 |
| 5,311,813 | A * | 5/1994 | Fairbanks et al. | 99/645 |
| 5,421,246 | A * | 6/1995 | Tippmann et al. | 99/448 |
| 5,528,912 | A * | 6/1996 | Weber | 68/6 |
| 5,722,544 | A * | 3/1998 | Williams | 211/188 |
| 5,782,174 | A * | 7/1998 | Cohn et al. | 99/476 |
| 5,996,820 | A | 12/1999 | Broadnax | |
| 6,392,201 | B1 * | 5/2002 | Owens | 219/387 |
| 2006/0233925 | A1 | 10/2006 | Kawamura | |
| 2008/0216345 | A1 | 9/2008 | Barkfelt | |

* cited by examiner

*Primary Examiner* — Jonathan Liu
*Assistant Examiner* — Stanton L Krycinski
(74) *Attorney, Agent, or Firm* — Robert C. Montgomery; Montgomery Patent and Design

(57) ABSTRACT

A foodstuff drying enclosure particularly suited to aid in the drying of foodstuffs such as meat and fish is provided with a frame covered with a mesh net providing an open air structure on all sides. The mesh net comprises a zippered top opening which enabling access to the foodstuffs. The frame supports a horizontally removable mesh tray having openings which provide sufficient air flow to dry the food placed upon it.

13 Claims, 7 Drawing Sheets

DRYING RACK FOR MEAT

RELATED APPLICATIONS

There are currently no applications co-pending with the present application.

FIELD OF THE INVENTION

The presently disclosed subject matter is directed to devices for preparing meat and fish. More particularly, the present invention relates to a drying rack for foodstuffs such as meat and fish.

BACKGROUND OF THE INVENTION

Historically the preservation of food such as meat and fish was an extremely important practice that could mean the difference between survival and death. While food preservation is not nearly as important in the developed countries today as it was in the past, it is nonetheless still important, as preserving food can enhance natural flavors. In addition, residents of third world countries often still must practice food preservation for survival.

One (1) popular method of preserving meat and fish is drying. Food drying techniques have been practiced for generations to ensure that an adequate supply of protein is available throughout the year. However, even given its long history, this does not mean that the drying of meat and fish is not without problems. Perhaps the greatest of these problems is keeping the food free from contact with insects such as Bluebottle flies, carrion flies, or beetles which can lay their eggs on the food while it is still damp. Another problem, which is related to the first, is protecting food from dirt, dust and other airborne contaminants. Yet another problem is how to support the food while it is drying, as contact with a solid surface will prevent or delay drying.

Accordingly, there exists a need for a means by which food products such as meat and fish can be easily preserved and dried without being contaminated by insects and without impeded drying.

SUMMARY OF THE INVENTION

The principles of the present invention provide for a foodstuff drying rack for easily preserving and drying foodstuffs without contamination by insects.

The principles of the present invention provide for a dry rack having a rigid frame assembly with a lower frame, an upper frame, a first front frame member connecting the lower frame to the upper frame, a second front frame member connecting the lower frame to the upper frame, a first rear frame member connecting the lower frame to the upper frame, a second rear frame member connecting the lower frame to the upper frame, and first, second, third, and fourth support legs extending from the lower frame. The frame assembly is constructed such that a tray assembly can slide through the first and front frame members and into the first and second rear frame members. A net assembly fits over the tray assembly and the frame assembly, except for its support legs. The net assembly has a top net section, a first side net section, a second side net section, a lower front net section, an upper front net section, and a bottom net section.

The principles of the present invention further provide for a drying rack having a rigid frame assembly with a lower frame, an upper frame, a first front frame member connecting the lower frame to the upper frame, a second front frame member connecting the lower frame to the upper frame, a first rear frame member connecting the lower frame to the upper frame, a second rear frame member connecting the lower frame to the upper frame, and first, second, third, and fourth support legs extending from the lower frame. The frame assembly is constructed such that a first tray assembly and a second tray assembly can slide through the first and front frame members and into the first and second rear frame members. A net assembly fits over the first and second tray assemblies and the frame assembly, except for its support legs. The net assembly has a top net section, a first side net section, a second side net section, a lower front net section, an upper front net section, and a bottom net section.

The principles of the present invention further provide for a drying rack having a rigid frame assembly comprised of a lower frame, an upper frame, a first frame member connecting the lower frame to the upper frame, a second frame member connecting the lower frame to the upper frame, a third frame member connecting the lower frame to the upper frame, and a fourth frame member connecting the lower frame to the upper frame. The drying rack further includes a first support bracket installed on the first frame member, a second support bracket installed on the second frame member, a third support bracket installed on the third frame member, and a fourth support bracket installed on the fourth rear frame member. A first rod is disposed between the first support bracket and the second support bracket while a second rod is disposed between the third support bracket and the fourth support bracket. At least one (1) cord for hanging foodstuffs is placed between the first rod and the second rod. Finally a net assembly is located over the first rod and the second rod. The net assembly includes a top net section, a first side net section, a second side net section, a lower front net section, an upper front net section, and a bottom net section.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

Figure 1:
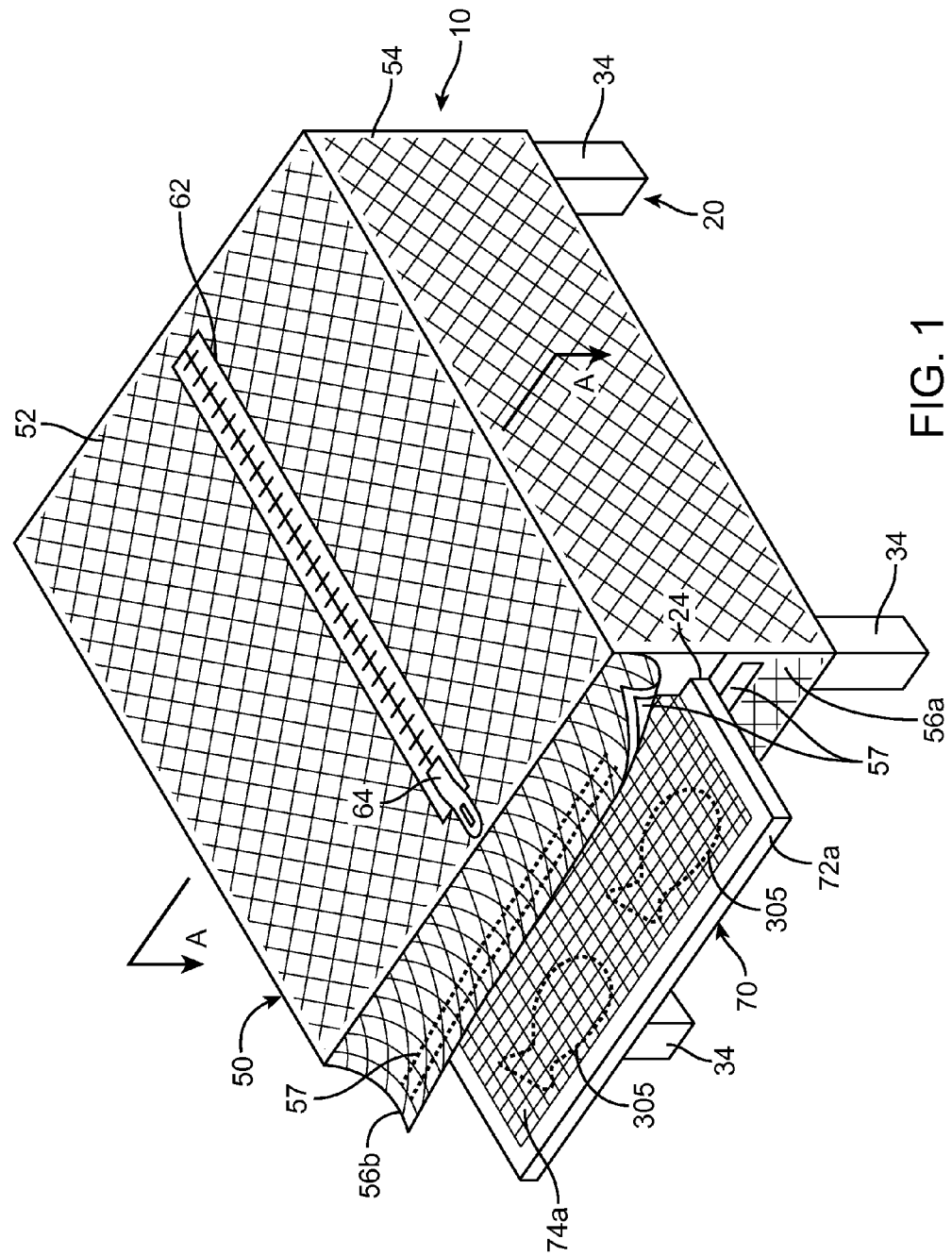
FIG. 1 is a perspective view of a drying rack 10 that is in accord with a preferred embodiment of the present invention.

DESCRIPTIVE KEY 10 drying rack for meat
20 frame assembly
22a first front frame member
22b second front frame member
24 front slot
26 fastener aperture
30a first rear frame member 30b second rear frame member
32 rear slot
34 leg
35 counterbore
36a front upper frame
36b rear upper frame
36c front lower frame
36d rear lower frame
38 attaching surface
40 dowel post
42 socket
50 net assembly
52 top net section
54 side net section
56a lower front net section
56b upper front net section
57 magnet
58 bottom net section
60 rear net section
62 zipper
64 zipper puller
70 mesh tray assembly
72a front tray frame
72b rear tray frame
74a front mesh panel
74b rear mesh panel
100 multi-tray embodiment
122a alternate first front frame member
122b alternate second front frame member
130a alternate first rear frame member
130b alternate second rear frame member
124a alternate upper front slot
124b alternate lower front slot
132a alternate upper rear slot
132b alternate lower rear slot
150 alternate net assembly
200 foodstuff hanging embodiment
202 rod
204 support bracket
206 cord
300 fastener
305 foodstuff

DETAILED DESCRIPTION OF THE PREFERRED EMBODIMENT

The best mode for carrying out the invention is presented in terms of its preferred embodiment, herein depicted within FIGS. 1 through 7, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Figure 2:
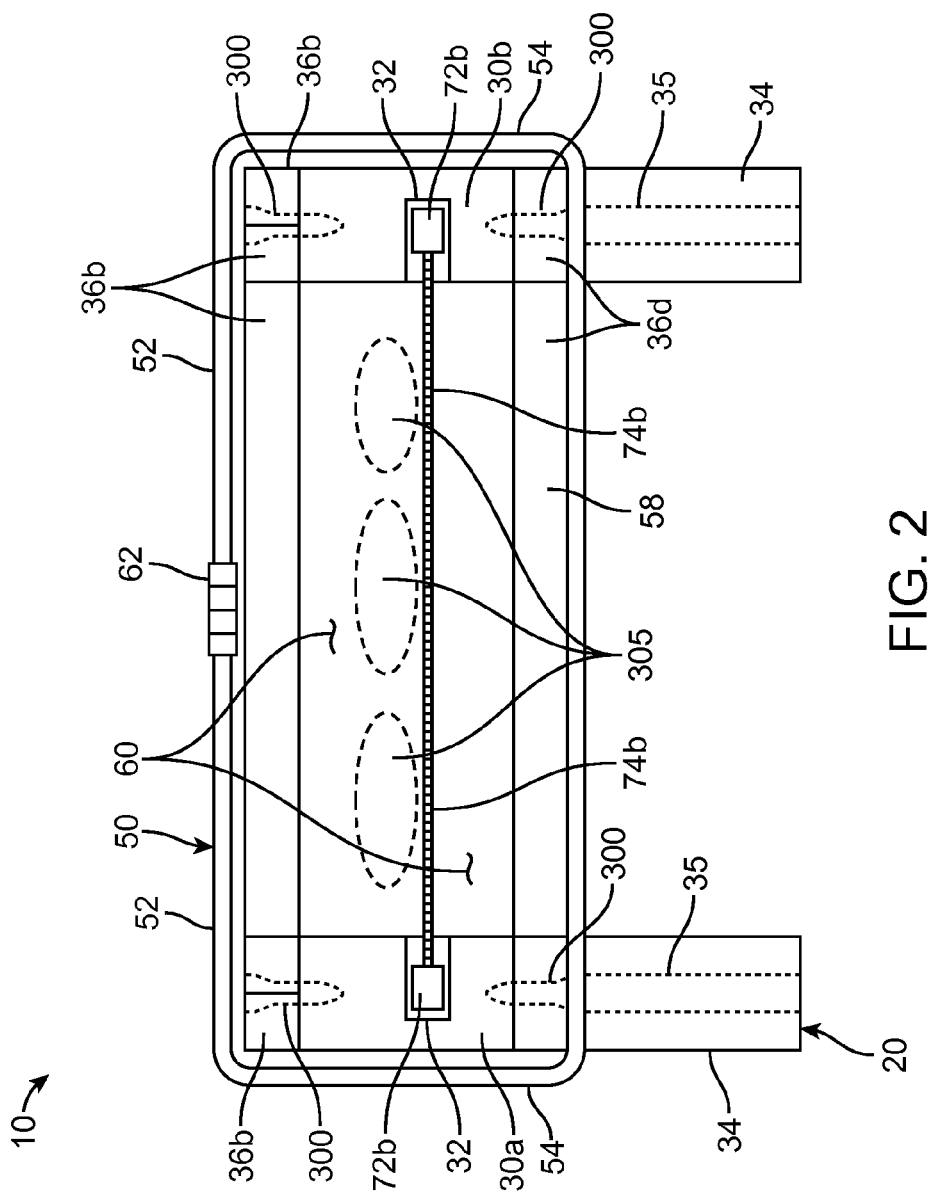
FIG. 2 is a section view of the drying rack taken along section line A-A of FIG. 1.
Figure 3:
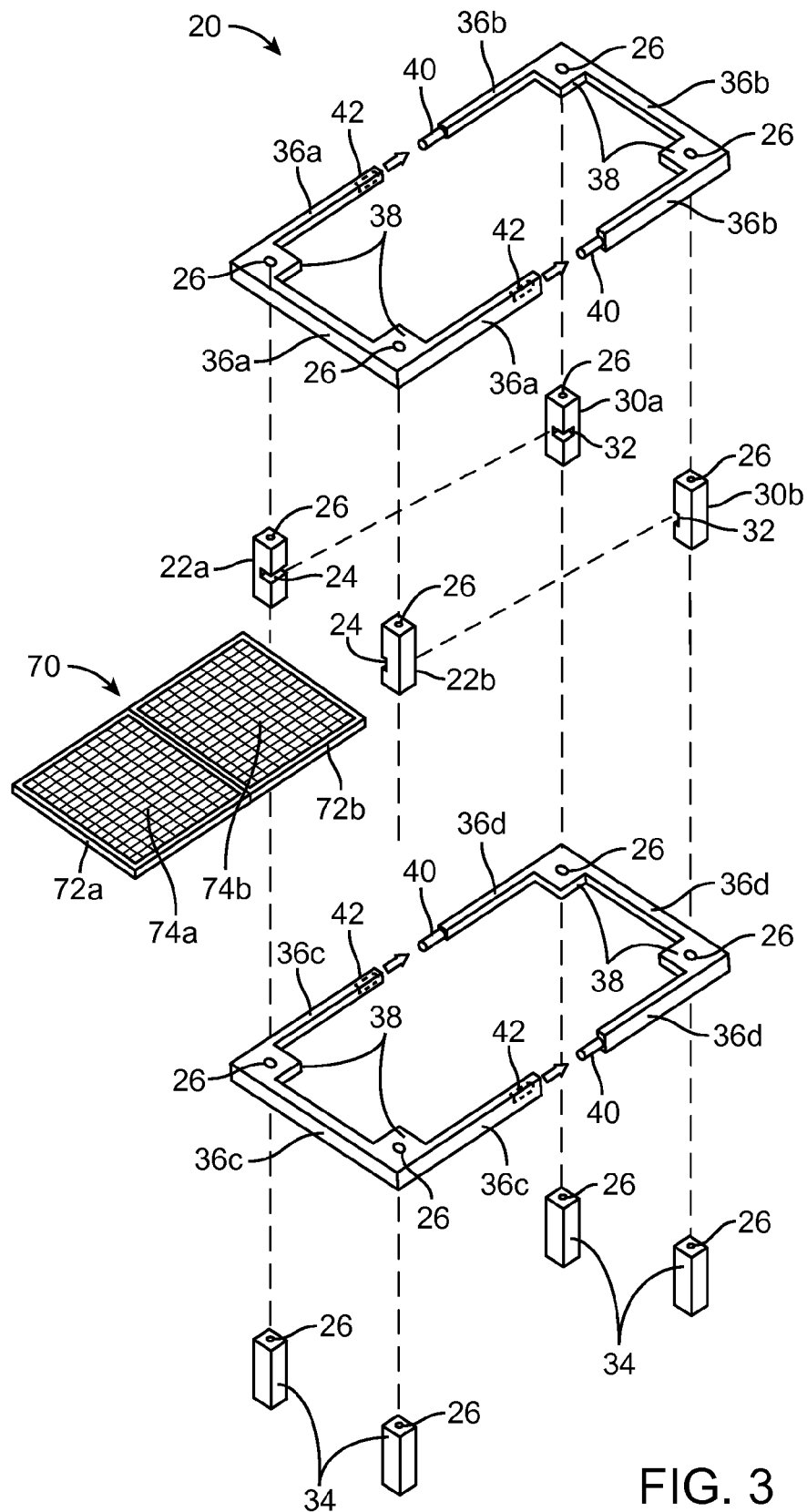
FIG. 3 is an exploded perspective view of a frame 20 and a tray 70 of the drying rack 10 shown in FIGS. 1 and 2.
Figure 4:
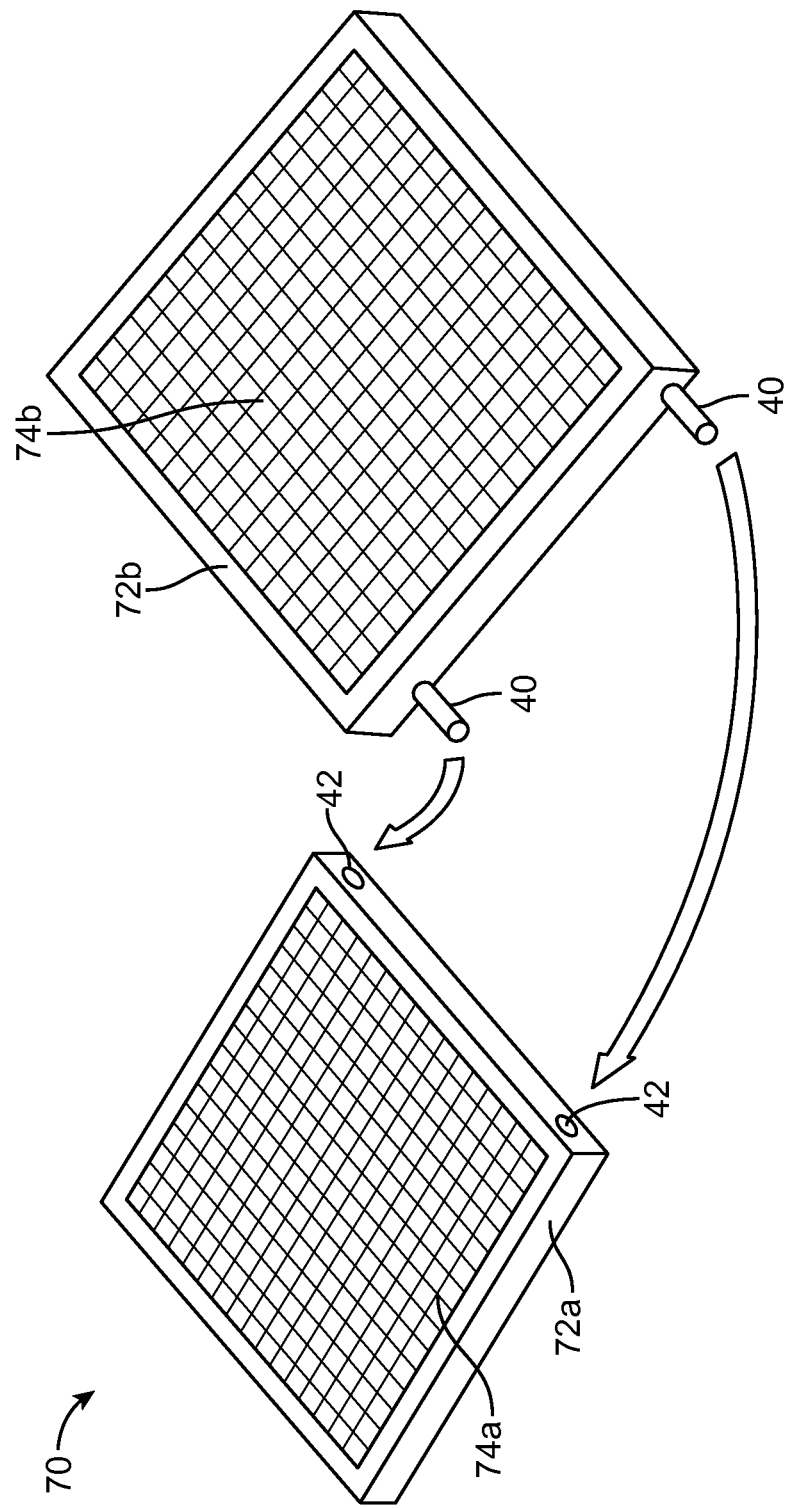
FIG. 4 is a close-up view of a mesh tray 70 of the drying rack 10 shown in FIGS. 1 and 2.
Figure 5:
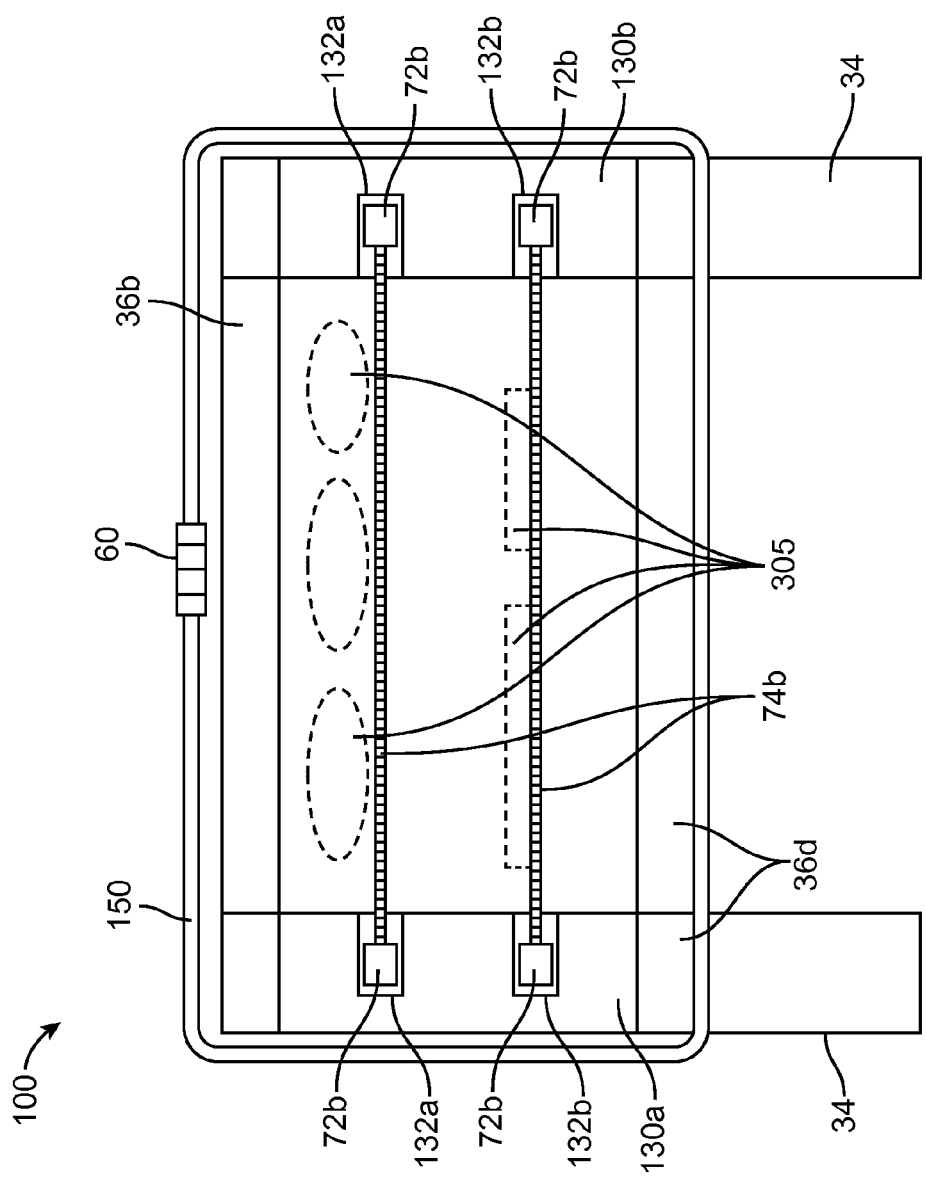
FIG. 5 is a section view of a preferred multi-tray embodiment 100 of the present invention.
Figure 6:
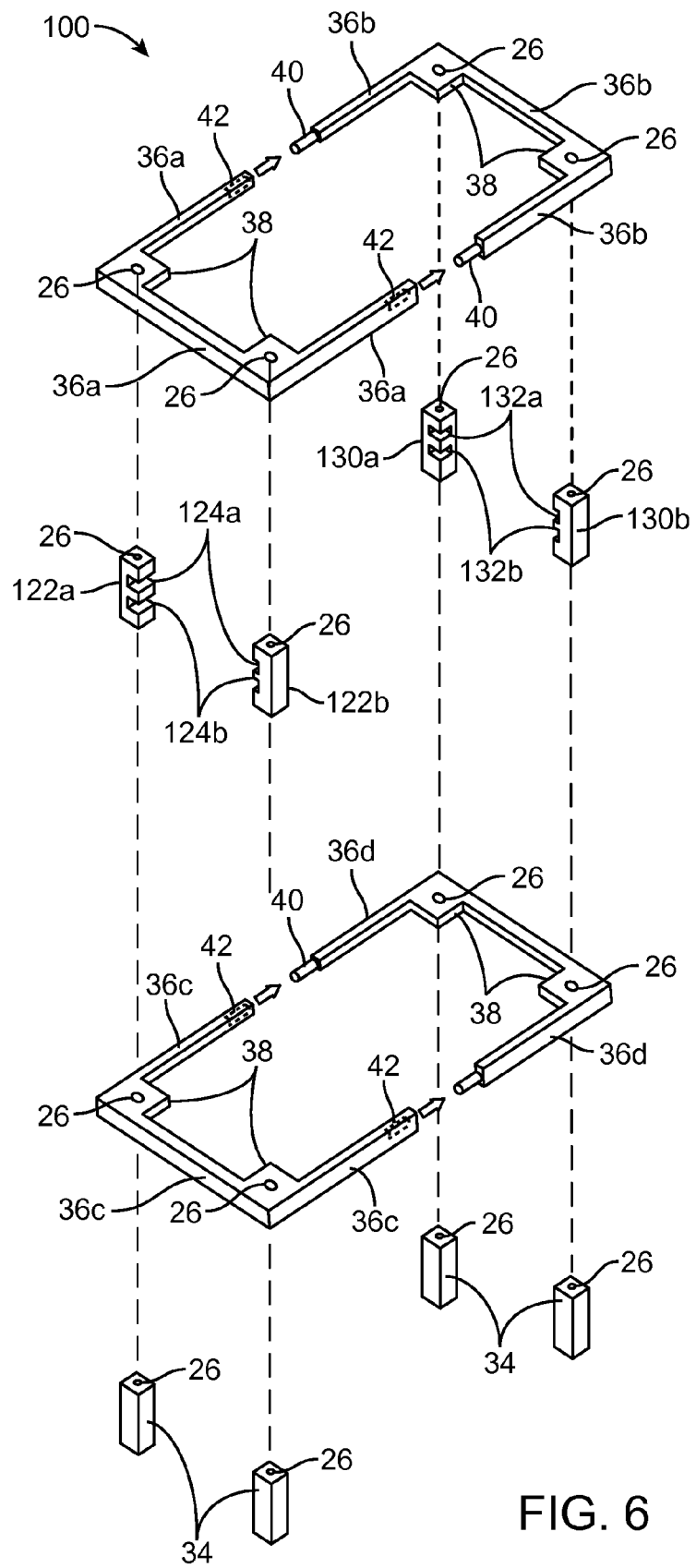
FIG. 6 is an exploded perspective view of frame portions 36a, 36b, 36c, 36d, 122a, 122b, 130a, 130b of the multi-tray embodiment 100 shown in FIG. 5; and, FIG. 7 is a perspective view of a preferred foodstuff hanging embodiment 200 of the present invention.
Figure 7:
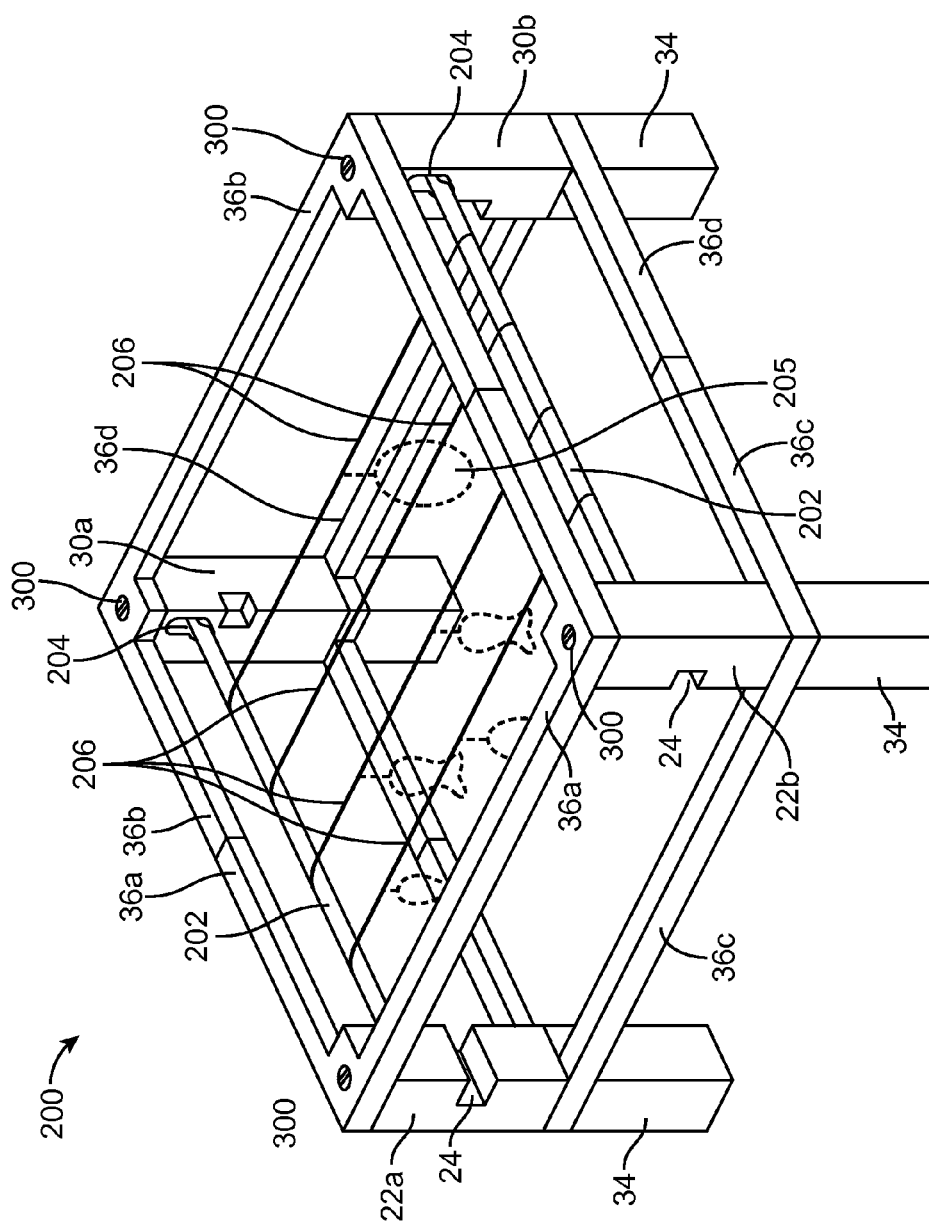

The best mode for carrying out the invention is presented in terms of its preferred embodiment, herein depicted within FIGS. 1 through 4, and in terms of alternate embodiments, herein depicted within FIGS. 5 through 7. Refer now to FIGS. 1 and 2 respectively, perspective and section views of a drying rack 10. The drying rack 10 comprises three main assemblies, a frame assembly 20, a net assembly 50, and a mesh tray assembly 70.

The frame assembly 20 provides a rectangular structure that is covered by the net assembly 50 to form a freely ventilating enclosure for air drying meat-type foodstuffs 305 such as fish, poultry, beef, pork, and the like. The frame assembly 20 is preferably approximately one and one-half feet (1½ ft.) wide, three feet (3 ft.) long, and one foot (1 ft.) high. However, it is understood that the frame assembly 20 may be provided in various lengths, widths, and heights based upon a user's preference and required capacity for drying foodstuffs 305.

The net assembly 50 comprises a flexible open mesh material which provides ample airflow to effectively dry the foodstuffs 305. The net assembly 50 is envisioned as being made of a plastic or fiberglass mesh similar to conventional mosquito nets. The net assembly 50 is comprised of sewn or otherwise bonded panels into a rectangular enclosure having a top net section 52, a pair of side net sections 54, a lower front net section 56a, an upper front net section 56b, and a bottom net section 58. However, the net assembly 50 might be a unitarily molded plastic body or similar alternative.

The lower 56a and upper 56b front net sections open along the front surface of the net assembly 54 to enable insertion of the mesh tray assembly 70. The front net sections 56a, 56b have integral sections with magnets 57 that are sewn into respective overlapping edges. This arrangement enable easy opening and closing of the front net sections 56a, 56b when inserting the mesh tray assembly 70 and positive retention forces to keep those front sections closed.

The mesh tray assembly 70 (best shown in FIG. 4) supports various foodstuffs 305. Access into the drying rack 10 is via a zipper 62 which is integrated into the top net section 52 to allow easy top access to load and unload foodstuffs 305.

Still referring to FIGS. 1 and 2, the frame assembly 20 of the drying rack 10 forms a rigid rectangular structure having extended legs 34 at each corner. The legs 34 support and elevate the net assembly 50, the mesh tray assembly 70 and its included foodstuff 305 approximately one foot (1 ft.) above the floor (also see FIG. 3). The frame assembly 20 and the mesh tray assembly 70 are preferably made using molded or extruded plastic materials; however, other suitable materials may be utilized with equal benefit such as, but not limited to: stainless steel, aluminum, wood, and the like.

Referring now to FIGS. 3 and 4, respectively exploded views of the frame assembly 20 and the tray assembly 70, the frame assembly 20 has a first front frame member 22a, a second front frame member 22b, a first rear frame member 30a, and a second rear frame member 30b. Each frame member 22a, 22b, 30a, 30b is a vertical structure having a rectangular cross-section and fastener apertures 26 at their top and bottom. The fastener apertures 26 facilitate attachments to a front upper frame 36a, a rear upper frame 36b, a front lower frame 36c, and a rear lower frame 36d using common threaded fasteners 300 (shown in FIG. 2).

The front 36a and rear 36b upper frames and the front 36c and rear 36d lower frames form respective horizontal two-piece rectangular structures. Those horizontal structures attach to the frame members 22a, 22b, 30a, 30b at integral attaching features 38 located at the inside corners of the upper frame 36a, 36b and lower frame 36c, 36d. The upper frames 36a, 36b and the lower frames 36c, 36d are respectively affixed to each other using integral dowel posts 40 and sockets 42, best understood with reference to FIG. 4. The use of the dowel posts 40 and sockets 42 add strength to the resulting horizontal two-piece rectangular structures.

Referring now to FIGS. 2 and 4 as required, during assembly of the drying rack 10 the net assembly 50 is wrapped around to encompass the frame members 22a, 22b, 30a, 30b, 36a, 36b, 36c, 36d. Subsequently, the legs 34 are fastened to the bottoms of the lower frames 36c, 36d via additional fasteners 300 which are inserted into counterbores 35 of each leg 34. This elevates the drying rack 10.

The front frame members 22a, 22b include integral front slots 24 at an intermediate height along inwardly facing surfaces. The slot features 24 are rectangular and support horizontal insertion and support the mesh tray assembly 70 into the frame assembly 20. The rear frame members 30a, 30b have corresponding rear slots 32 which support the forward edges of the mesh tray assembly 70. Thus by using the slot features 24, 32 all four (4) corners of the mesh tray assembly 70 are supported.

The front slots 24 and rear slots 32 are arranged in a common horizontal plane to allow smooth insertion and removal of the tray assembly 70. The rear slots 32 are envisioned as being sufficiently deep to allow insertion of the mesh tray assembly 70 approximately half way through each rear frame members 30a, 30b. Thus the end of the rear slots 32 limit the insertion of the mesh tray assembly 70 and thus enable accurate positioning the mesh tray assembly 70 within the drying rack 10.

The mesh tray assembly 70 has a two-piece construction that is similar to that of the frames 36a, 36b, 36c, 36d. In particular, the mesh tray assembly 70 is joined at intermediate side locations to improve structural strength and increase the load-carrying capacity of the mesh tray assembly 70. The mesh tray assembly 70 has a front tray frame 72a and a rear tray frame 72b respectively having integral male dowel posts 40 and female sockets 42. The front tray frame 72a and the rear tray frame 72b support respective front mesh panel 74a and rear mesh panel 74b. The mesh panels 74a, 74b comprise a plurality of rectangle openings arranged along perpendicular axes which provide ample exposure of the foodstuffs 305 to the surrounding air. It is envisioned that the mesh tray assembly 70 is a unitary plastic structure produced in an injection molding process. However, other materials may be utilized such as stainless steel, aluminum, wood, and the like.

Refer now to FIGS. 5 and 6 respectively, section and exploded views of a multi-tray embodiment 100 according to an alternate embodiment of the present invention. The multi-tray embodiment 100 is comprised of similar materials and provides the similar drying function as the preferred embodiment 10, but supports two (2) mesh tray assemblies 70. The multi-tray embodiment 100 includes an alternate first front frame member 122a, an alternate second front frame member 122b, an alternate first rear frame member 130a, and an alternate second rear frame member 130b, each high enough to hold two (2) mesh tray assemblies 70. The alternate front frame members 122a, 122b have respective alternate upper front slots 124a and alternate lower front slots 124b. The alternate rear frame members 130a, 130b have alternate upper rear slots 132a and alternate lower rear slots 132b. The slots 124a, 124b, 132a, 132b have identical shapes and serve the same functions as the previously described front slots 24 and rear slots 32 of the preferred embodiment 10 (see FIG. 3). The multi-tray embodiment 100 has an enlarged alternate net assembly 150 that is capable of encompassing the taller frame members 122a, 122b, 130a, 130b, and the two (2) mesh tray assemblies 70, thereby providing increased foodstuff 305 drying capacity.

FIG. 7 illustrates a perspective view of a hanging foodstuff embodiment 200 according to another alternate embodiment of the present invention. The hanging foodstuff embodiment 200 has accessory equipment that reconfigures the present invention to hang foodstuffs 205 for drying instead of using the previously described mesh tray assemblies 70.

The hanging foodstuff embodiment 200 is shown with the net assembly 50 removed to enable a clearer illustration. In use, the mesh tray assembly 70 is removed, and four (4) support brackets 204 are installed using threaded fasteners 300, one (1) on each of the frame members 22a, 22b, 30a, 30b. The support brackets are located along opposing inwardly facing surfaces. Each support bracket 204 comprises a saddle-shaped fixture that is capable of supporting an end of a rod 204. Each opposing aligned pair of support brackets 204 support a rod 202, thereby providing two (2) parallel rods 202 that extend between respective front 22a, 22b and rear 30a, 30b frame members. The rods 202 support a plurality of cords 206 that enable hanging various foodstuffs 305. The cords 206 are envisioned as being made of string, light rope, plastic tubing, wire, or the like.

The preferred embodiment of the present invention can be utilized by the common user in a simple and effortless manner with little or no training. After initial purchase or acquisition of the drying rack 10, it would be installed as indicated in FIG. 1. The method of installing and utilizing the drying rack 10 may be achieved by performing the following steps: procuring a model of the drying rack 10 having the desired length and width; joining the front upper frame 36a to the rear upper frame 36b by inserting respective dowel posts 40 and sockets 42 together; joining the front lower frame 36c to the rear lower frame 36d by inserting respective dowel posts 40 and sockets 42 together; assembling the frame members 22a, 22b, 30a, 30b to attaching surfaces 38 of each upper 36a, 36b and lower 36c, 36d frame using the provided fasteners 300; detaching the plastic magnets 57 of the front net sections 56a, 56b and opening the front net sections 56a, 56b; wrapping the net assembly 50 around the frames 22a, 22b, 30a, 30b, 36a, 36b, 36c, 36d; attaching the four (4) legs 34 to bottom surfaces of respective front lower 36c and rear lower 36d frames by inserting fasteners 300 into counterbores 35 of the legs 34; screwing the fasteners 300 into fastener apertures 26 along the bottom surface of each lower frame 36c, 36d; assembling the front tray frame 72a to the rear tray frame 72b by inserting respective dowel posts 40 and sockets 42 together; inserting the mesh tray assembly 70 between the front net sections 56a, 56b and into the front slots 24 until the mesh tray assembly 70 is seated within the rear slots 32; opening the zipper 62; placing foodstuffs 305 upon the mesh tray assembly 70; closing the zipper 62; allowing sufficient time and air circulation through the net assembly 50 to dry the food stuffs 305; removing the food stuffs individually for normal consumption or collectively for storage using the zipper 62; replenishing the foodstuffs 305 in the drying rack 10; and, benefiting from a compact and economical means to dry foodstuffs 305 in an insect-free environment using the drying rack 10.

The method of installing and utilizing the alternate multi-tray embodiment 100 may be achieved by performing the following additional steps: assembling the alternate multi-tray embodiment 100 in a similar manner as the preferred embodiment 10, but using the alternate frame members 122a, 122b, 130a, 130b and the alternate net assembly 150; inserting a lower mesh tray assembly 70 into alternate lower front 124b and alternate lower rear 132b slots; opening the zipper 62; placing a quantity of foodstuffs 305 onto the lower mesh tray assembly 70 as previously described; inserting the upper mesh tray assembly 70 into the alternate upper front 124b and alternate upper rear 132a slots; placing a quantity of foodstuffs 305 unto the top mesh tray assembly 70; closing the zipper 62; and, drying, removing, and replenishing the food stuffs 305 as described above.

The method of installing and utilizing the alternate foodstuff hanging embodiment 200 may be achieved by performing the following additional steps: assembling the frame members 22a, 22b, 30a, 30b to the upper 36a, 36b and lower 36c, 36d frame portions as previously described; installing the four (4) support brackets 204 upon opposing inwardly facing surfaces of said frame members 22a, 22b, 30a, 30b using the provided fasteners 300; placing the two (2) rods 202 upon opposing pairs of said support brackets 204; tying a plurality of spanning lengths of cord 206 therebetween said rods 202; enclosing said frame members 22a, 22b, 30a, 30b and rods 202 within the net assembly 50 as previously described; attaching the leg portions 34 as previously described; opening the zipper 62; hanging various foodstuffs 305 upon the cord portions 206 as desired; closing the zipper 62; and, drying, removing, and replenishing hanging food stuffs 305 as described above.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A drying rack, comprising:
    a rigid frame assembly having a lower frame, an upper frame, a first front frame member connecting said lower frame to said upper frame, a second front frame member connecting said lower frame to said upper frame, a first rear frame member connecting said lower frame to said upper frame, a second rear frame member connecting said lower frame to said upper frame, and first, second, third, and fourth support legs extending from said lower frame;
    a tray assembly slideably attached to said first front frame member, said second front frame member, said first rear frame member, and said second rear frame member; and
    a net assembly, comprising:
        a top net section, a first side net section, a second side net section, a lower front net section, an upper front net section, and a bottom net section, each net section further comprising a flexible open mesh material; and,
        a plurality of magnets;
        wherein said lower front net section and said upper front net section have overlapping edges with said plurality of magnets that provide positive retention forces;
    wherein said net assembly fits over said lower frame, said upper frame and said tray assembly; and,
    wherein said first, second, third, and fourth support legs extend from said net assembly.

2. The drying rack according to claim 1, wherein said top net section, said first side net section, said second side net section, said lower front net section, said upper front net section, and said bottom net section comprise sewn panels.

3. The drying rack according to claim 1, wherein said top net section includes an access zipper.

4. The drying rack according to claim 1, wherein said upper frame and said lower frame include fastener apertures for facilitating attachment to said first front frame member, said second front frame member, first rear frame member, and said second rear frame member.

5. The drying rack according to claim 1, wherein said upper frame is comprised of a front upper frame and a rear upper frame joined together with dowel posts.

6. The drying rack according to claim 1, wherein said lower frame is comprised of a front lower frame and a rear lower frame joined together with dowel posts.

7. The drying rack according to claim 1, wherein said first front frame member and said second front frame member have front slots dimensioned to hold said tray assembly such that said tray assembly can freely slide.

8. The drying rack according to claim 7, wherein said first rear frame member and said second rear frame member have rear slots dimensioned to hold said tray assembly such that said tray assembly is blocked from sliding in one direction.

9. The drying rack according to claim 1, wherein said tray assembly includes a mesh base attached to a tray frame.

10. The drying rack according to claim 9, wherein said tray frame is comprised of a front tray frame and a rear tray frame joined together with dowel posts.

11. A drying rack, comprising:
    a rigid frame assembly having a lower frame, an upper frame, a first front frame member connecting said lower frame to said upper frame, a second front frame member connecting said lower frame to said upper frame, a first rear frame member connecting said lower frame to said upper frame, a second rear frame member connecting said lower frame to said upper frame, and first, second, third, and fourth support legs extending from said lower frame;
    a first tray assembly slideably attached to said first front frame member, said second front frame member, said first rear frame member, and said second rear frame member;
    a second tray assembly slideably attached to said first front frame member, said second front frame member, said first rear frame member, and said second rear frame member; and,
    a net assembly, comprising:
        a top net section, a first side net section, a second side net section, a lower front net section, an upper front net section, and a bottom net section, each net section further comprising a flexible open mesh material; and,
        a plurality of magnets;
        wherein said lower front net section and said upper front net section have overlapping edges with said plurality of magnets that provide positive retention forces;
    wherein said net assembly fits over said lower frame, said upper frame, said first tray assembly, and said second tray assembly; and,
    wherein said first, second, third, and fourth support legs extend from said net assembly.

12. The drying rack according to claim 11, wherein said first front frame member and said second front frame member have first front slots dimensioned to hold said first tray assembly such that said first tray assembly can freely slide and second front slots dimensioned to hold said second tray assembly such that said second tray assembly can freely slide.

13. The drying rack according to claim 12, wherein said first rear frame member and said second rear frame member have first rear slots dimensioned to hold said first tray assembly such that said first tray assembly is blocked from sliding in one direction and second rear slots dimensioned to hold said second tray assembly such that said second tray assembly is blocked from sliding in one direction.

* * * * *